Figure 1:
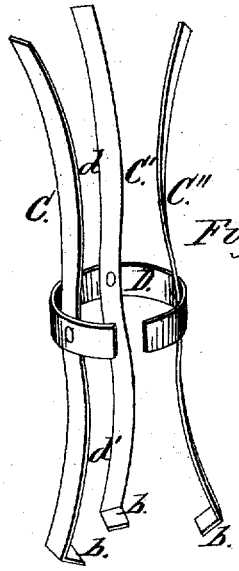
Figure 2:
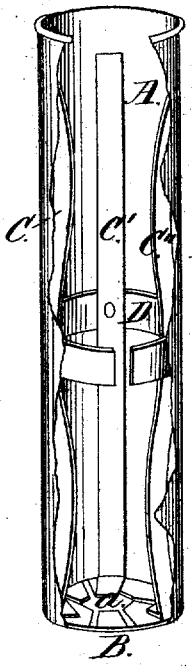
Figure 3:
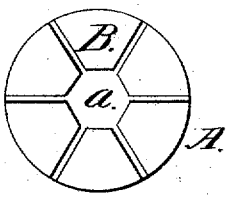
Figure 4:
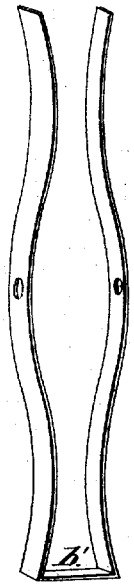
Figure 5:
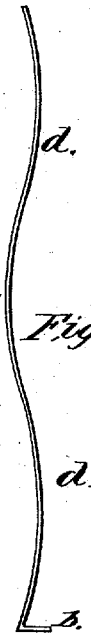

W. W. RICHARDSON.

Whip-Sockets.

No. 6,148. Reissued Nov. 24, 1874.

Attest.
A. Sprague
H. F. Eberts

Inventor.
Wm. W. Richardson
By atty
Thos. A. Sprague

THE GRAPHIC CO. PHOTO-LITH. 39 & 41 PARK PLACE, N.Y.

UNITED STATES PATENT OFFICE.

WILLIAM W. RICHARDSON, OF WESTFIELD, MASSACHUSETTS.

IMPROVEMENT IN WHIP-SOCKETS.

Specification forming part of Letters Patent No. 152,688, dated June 30, 1874; reissue No. 6,148, dated November 24, 1874; application filed September 12, 1874.

*To all whom it may concern:*

Be it known that I, WILLIAM W. RICHARDSON, of Westfield, Hampden county, State of Massachusetts, have invented a new and useful Improvement in Whip-Sockets; and I do declare that the following is a true and accurate description thereof, reference being had to the accompanying drawings and to the letters of reference marked thereon, and being a part of this specification, in which—

Figure I is a perspective view of the interior springs for the interior of the socket. Fig. II is a perspective view of the socket, with a portion broken out to show the arrangement of the springs within the same. Fig. III is an end view of the lower or bottom end of the socket. Fig. IV is a modification of the springs, and Fig. V is a detail view.

Like letters refer to like parts in each figure.

The nature of the invention relates to the construction of a whip socket or holder to be attached to vehicles, so arranged, by means of suitable springs, that the whip will be firmly held in place when inserted in the barrel of the implement, in such a manner that the whip will stand in the center of the socket, and that under no circumstances will there be any abrasion or damage to the whip. The invention consists in the peculiar construction and arrangement of the various parts, as more fully hereinafter described.

In the accompanying drawings, A represents the whip socket or barrel, which may be formed of any suitable material, and have its bottom B formed by notching that end of the material when sheet metal is used to permit the metal to be turned inwardly, or the diameter of the barrel may be reduced in any way, to prevent the springs from being accidentally forced through, and to seat the end of the whip. C C′ C″ are a series of springs, made of thin spring metal, in the form shown in Fig. V, substantially secured by rivets or otherwise to the expander-spring D, which, by its elasticity, will always rest against the inner wall of the socket or barrel of any size. A modification of this spring is shown in Fig. IV, where the spring is made of one piece of metal, the flange *b* extending across the socket, and then turning upwardly to form the other part of the spring. When made in this form the strip of spring metal should be wider, and be concave upon its inner face, to conform somewhat to the shape of the whip-handle, and hold it firmly upright in the center of the socket; or two of these springs may be made, thereby having four upright parts, the connecting parts *b′* crossing at right angles. Each of these springs C C′ C″, being of the general form of a segment of an ellipse, is secured at one end to the expander or binding-spring D, while its other end is free to slide in the barrel of the socket from or toward its fixed end, as the spring itself is straightened or released by the whip; and when the springs C C′ C″ are used upon each side of the spring D, I prefer to form each one as shown in Figs. I and V—that is, to be attached in the middle to the spring D—the binder-spring D being in all cases the fixed point from which each spring is straightened, so that each spring or each group of springs upon one side of the spring D acts independently of each or all upon the other side; and the group of springs, when inserted into the barrel of the socket until their ends are recessed therein, are securely held to form a part of the socket by the expansion of spring D against its inner wall, and the free springs hold the whip, when inserted, by their elasticity, thereby keeping it steady in the center of the socket, and away from all danger of abrasion by coming in contact with the upper end or ring of the socket.

When the socket has a bottom, it is not necessary, when each of the springs C C′ C″ are made of separate pieces of metal, as shown in Fig. I, that their lower ends should be turned inwardly, as at *b*, for the end of the whip may rest on the bottom of the socket.

What I claim as my invention, and desire to secure by Letters Patent, is—

In combination with a barrel or socket for holding them, two or more springs, C C′ C″, secured at their centers to the binding-spring D, to operate as and for the purpose shown and described.

WILLIAM W. RICHARDSON.

Witnesses:

HENRY FULLER,

SOLOMON SHEPARD.